Patented June 13, 1933

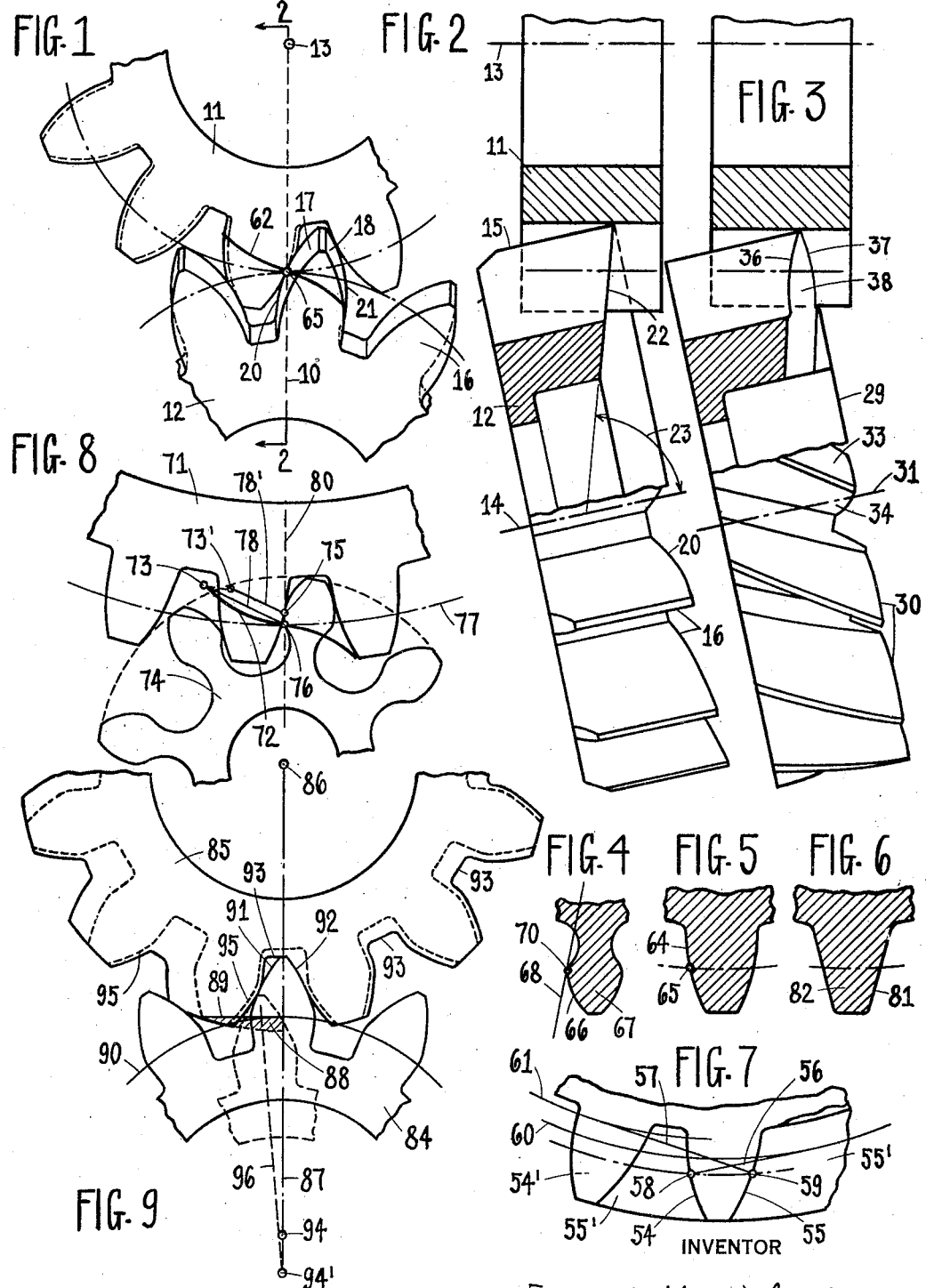

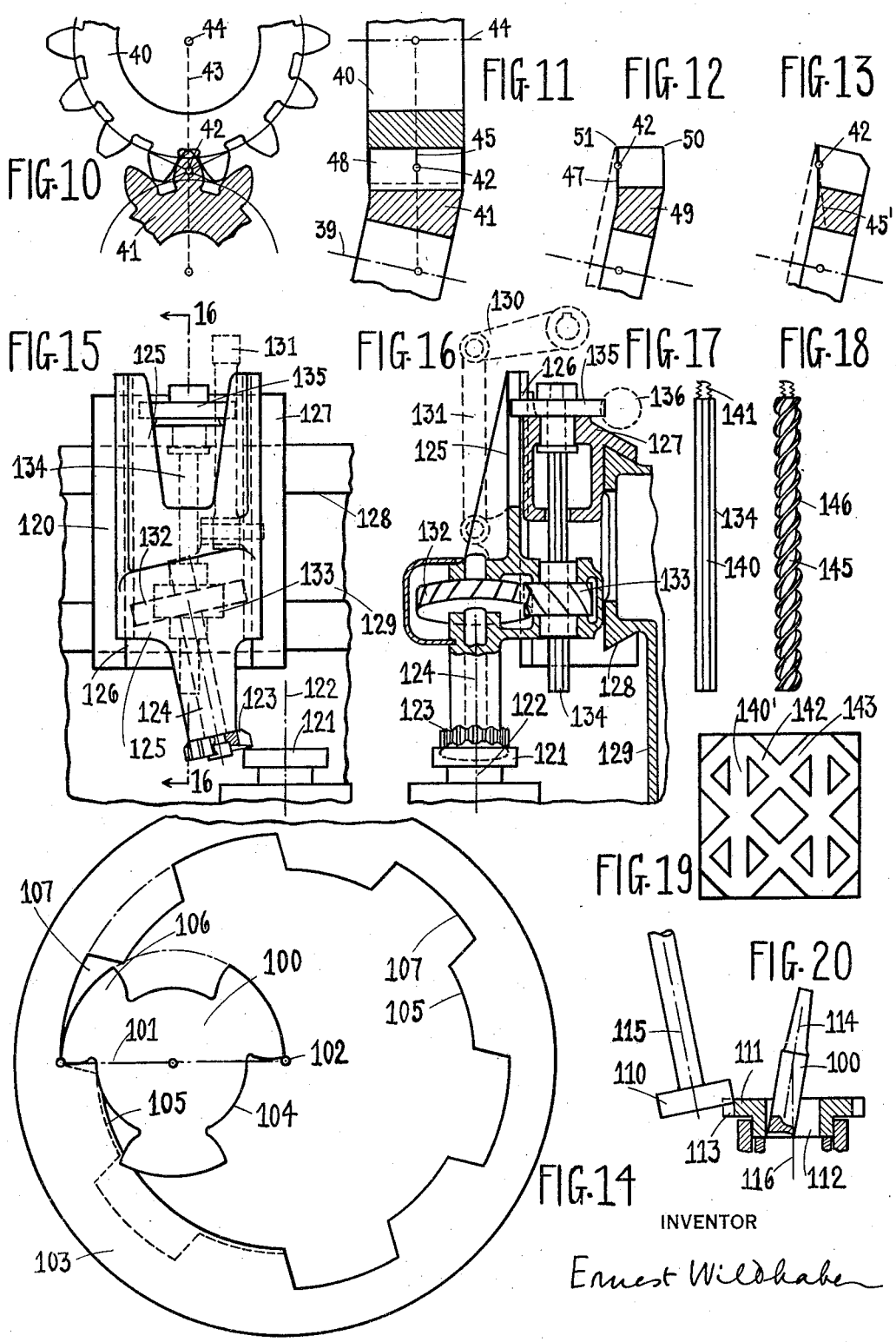

1,913,865

UNITED STATES PATENT OFFICE

ERNEST WILDHABER, OF BROOKLYN, NEW YORK

CUTTING TOOL

Application filed July 14, 1930. Serial No. 467,642.

The present invention relates to improvements in cutting tools and cutting devices, in which a cutting tool is fed about an axis and cutting motion is provided in a direction inclined to said axis, and often nearly parallel to said axis.

Said cutting tool operates on a rotatably mounted blank, which is turned on its axis while the tool is fed about its own axis.

The present invention relates broadly to all tools of the aforesaid character, and particularly to shaping or planing tools for cutting in a reciprocating motion. Usually the reciprocation is imparted to the tool. It is however understood that it is immaterial whether the tool is reciprocated relatively to a blank or whether the blank is reciprocated relatively to a tool. The relative motion between the tool and the blank is the thing which alone matters. Tools for reciprocating relatively to a blank therefore embrace all tools which cut in a reciprocating motion, regardless of whether the tools are themselves reciprocated, or whether the reciprocation is attributed to the blank.

Tools of the character referred to cut a profile which differs from their own cutting profile. The profile formed on the blank is generated by the tool, that is to say it is gradually enveloped by the cutting path of the tool profile.

A tool is relieved back of the cutting edges to form a cutting clearance. Tools of conventional character are relieved in a manner that the cutting profiles appearing after repeated resharpening are disposed nearer to the cutter axis than the original cutting profiles.

Moreover the later formed cutting profiles should have a different inclination and shape than the initial cutting profiles. This known requirement complicates the shape of the tools and adds to their limitations.

One object of the present invention is to provide a tool of the aforesaid character, which contains identical cutting edges of constant distance from the tool axis at all stages of its life and regardless of how often it has been resharpened, and where the relief or cutting clearance is obtained through a novel position of the cutter axis. Another object is to provide a simple and inexpensive cutting tool for slowly feeding about an axis, which shall be capable to generate a constant shape of composite profile on a rotatably mounted blank, regardless of how often said tool has been resharpened.

A further object is to provide a generating tool for slowly feeding about its axis, whose surfaces back of the cutting edges are surfaces extending along straight lines parallel to the cutter axis or are helical surfaces of equal lead and equal hand and concentric with said axis. Another object is to provide a generating tool for slowly feeding about its axis, whose axis may be set at the same distance from the axis of a given blank, regardless of how often the tool has been resharpened.

A further purpose of the present invention is to provide a tool for slowly feeding about its axis and reciprocating relatively to a blank in a direction inclined to said axis.

Other aims are to provide a device for use of the aforesaid tools, and to devise a method of shaping or planing gears, gear like articles, holes containing spline ways and other shapes with a tool rotatably mounted on an axis, said axis being so inclined to the direction of reciprocation as to provide a suitable amount of cutting clearance on a tool of constant cross sectional profile.

Various further objects will appear in the course of the specification and from recital of the appended claims.

Embodiments of the invention will be described with reference to the accompanying drawings, in which Fig. 1 is a partial view of the gear cutting tool constructed in accordance with the present invention, and shown in engagement with teeth of a gear blank.

Fig. 2 is a side view of the tool and the gear blank also shown in Fig. 1, and partly a section along lines 2—2 of Fig. 1.

Fig. 3 is a side view and section similar to Fig. 2 and illustrative of a tool having helical cutting teeth.

Fig. 4, Fig. 5, Fig. 6 are sections of various forms of cutting teeth extending parallel to the cutter axis and illustrative of cutters constructed in accordance with the present invention.

Fig. 7 is partial rear view of a tool formed in accordance with the present invention and containing helical cutting teeth.

Fig. 8 is a diagram illustrative of one of the novel purposes of tools constructed in accordance with the present invention.

Fig. 9 is a diagram explanatory of a novel way of gear generation, illustrative of another aspect of the present invention.

Fig. 10 and Fig. 11 are diagrammatic front views, partly in section, of a portion of a gear and a toothed member in mesh with each other, further explanatory of the principles of the present invention.

Fig. 12 and Fig. 13 are diagrammatic views related to Fig. 11 and further explanatory of said principles.

Fig. 14 is a diagram illustrative of a way of cutting holes provided with spline ways, in accordance with the present invention.

Fig. 15 is a simplified and partial front view of a device for shaping gears and other articles in accordance with the present invention.

Fig. 16 is a side view corresponding to Fig. 15, partly a section along lines 16—16 of Fig. 15.

Fig. 17 and Fig. 18 are views of splined shafts, which may be selectively used in the device illustrated in Fig. 15 and Fig. 16, for cutting spur gears and helical gears respectively.

Fig. 19 is a development in a larger scale of the inside surface of gear 133 of Fig. 15 and Fig. 16, illustrative of its straight and helical spline ways superimposed to each other, for selectively receiving shafts as indicated in Fig. 17 and Fig. 18.

Fig. 20 is a diagrammatic view illustrative of an arrangement, where two shaping tools work on the same gear blank, one tool cutting the teeth and the other tool cutting the hole and spline ways of said gear blank.

Referring to Fig. 1 and Fig. 2 numeral 11 denotes a spur gear blank disposed in engagement with a cutting tool 12 constructed in accordance with the present invention.

A gear blank (11) is cut by reciprocating tool 12 relatively to the gear blank in the direction of axis 13 of the gear blank. Moreover the gear blank and the cutting tool are slowly and intermittently turned on their respective axes, in timed relation to each other. The said turning motions constitute the generating feed. They are related to each other like the turning motions of two meshing gears, and enable the tool to produce a contour differing from the shape of its cutting profile.

In the conventional gear shaping process for cutting spur gears the axis of the cutting tool is parallel to the axis 13 of the gear blank 11, and the tool is reciprocated lengthwise of its axis. The conventional tool has the general form of a pinion which is slightly tapered, so that the diameter at its rear end is smaller than the diameter at its front end.

In contradistinction thereto cutting tool 12 has an axis 14 which is inclined to the axis 13 of gear blank 11. Axis 14 is contained in plane 10 (Fig. 1) and intersects axis 13 of the gear blank. Reciprocation is effected in a direction inclined to the axis of the tool.

With this disposition cutting clearance or relief may be obtained with a tool 12 of cylindrical form, see Fig. 2. The outline 15 of the tool extends parallel to the tool axis 14. The cutting teeth 16 of the tool project radially from the tool axis and extend parallel to the tool axis in the manner of spur gear teeth. The side surfaces 17, 18 as well as the top surface of a cutting tooth 16 are parallel to axis 14. The tops of the cutting teeth 16 lie in a cylindrical surface concentric with the tool axis.

Cutting edges 20, 21 are formed on tool 12 by cutting faces 22, which may be made portions of a conical surface concentric with the tool axis. The cutting faces 22 are inclined at an acute angle 23 with respect to the tool axis 14.

Tool 12 differs from a spur gear through the provision of inclined cutting faces (22), and the cutting teeth 16 differ from spur gear teeth conjugate to the teeth of a finished gear blank through their larger tooth addenda, as is readily understood.

Like conventional tools, the tools constructed in accordance with the present invention may be resharpened by regrinding the cutting faces (22). Other cutting edges are then formed on the side surfaces 17, 18 and on the top surfaces of the cutting teeth. These new cutting edges are displaced towards the rear end of the tool, as compared with the initial cutting edges. They are however identical in form with the initial cutting edges and they have exactly the same distance from the cutter axis. Through this characteristic they differ from the cutting edges of conventional tools of the character referred to, whose later cutting edges have a different distance from the tool axis and have a different shape as well.

Tools constructed in accordance with the present invention have the simplest possible structure, and are capable of producing exactly the same contour throughout their life regardless of the form of the cutting edges.

Fig. 3 illustrates a gear cutting tool 29 of the general form of a helical pinion, having helical cutting teeth 30 projecting radially from the tool axis 31. The side surfaces 33, 34 of a cutting tooth 30 are helical surfaces of equal lead and equal hand, and concentric with the tool axis 31.

Cutting edges 36, 37 are formed on the cutting teeth 30 by cutting faces 38, which are substantially perpendicular to the direction of the helical cutting teeth and therefore inclined to the tool axis. The cutting faces 38 are preferably made planes. The cutting edges formed in resharpening are here also identical with the initial cutting edges, and have the same distance from the tool axis as those.

Tools containing helical cutting teeth may be used for producing helical and herringbone gears, by reciprocating the tool relatively to a gear blank in the direction of the axis of the gear blank, while simultaneously turning the tool on its axis, as will be further described.

The cutting teeth 30 of tool 29 and also the cutting teeth 16 of tool 12 have a constant thickness along lines equidistant from the tool axis. In other words the thickness of the cutting teeth at any point depends only on the distance of said point from the tool axis, and is independent of the axial position of said point.

I shall now proceed to describe how the cutting edges and the cutting teeth of a tool may be determined so that the tool cuts the desired contour.

Reference is made to Fig. 10 and Fig. 11, which show a spur gear 40 in mesh with a tapered gear 41 whose axis 39 is disposed in plane 43, which also contains the axis 44 of spur gear 40. Numeral 42 denotes a point, at which the peripheral speeds of both gears 40 and 41 are equal. Point 42 may be called a pitch point and can be considered the contact point of two circles which roll upon each other without sliding during the mesh of the gears.

It is evident to those skilled in the art that spur gear 40 and a gear 41 conjugate to gear 40 may contact with each other in points whose tooth normals pass through pitch point 42, that is to say along a well known line of action which is contained in plane 45. Plane 45 passes through point 42 and is perpendicular to axis 44 of spur gear 40. The said line of action of spur gear 40 can be readily constructed with the established methods, and is for instance a straight line for each side of the teeth on involute spur gears. A tooth profile of gear 41 may be determined from the given line of action with the known methods of kinematics. A tooth profile so determined and passing through pitch point 42, is substantially contained also in plane 45. This tooth profile may be embodied as a cutting edge by providing a cutting face 47 (Fig. 12) and omitting the front portion (48, Fig. 11) of gear 41. A tool 49 (Fig. 12) so formed lacks as yet relief, or cutting clearance.

Relief or cutting clearance in general is provided by reducing the diameter of the tool back of its cutting edges. In the illustrated instance, where the unrelieved tool has a larger diameter at its rear end 50 than at its front end 51, relief may be provided by simply making the diameter at the rear end 50 the same as the diameter at the front end, that is to say by providing a tool of cylindrical form, see Fig. 13.

The aforesaid line of action is not the only one existing between gears 40 and 41. Other lines of action may be made use of, if it is desired to provide a cutting edge of different inclination; such as for instance a cutting edge extending along dotted line 45′ (Fig. 13).

The shape of a cutting edge may also be obtained through generation from a given contour of a blank, such as from the given tooth surfaces of a spur gear blank: A hardened gear is formed, for instance by accurate grinding, and tooth profiles of it are embodied as cutting edges. Preferably the tooth surfaces of the gear are relieved back of the cutting edges. The hardened gear is then positioned like gear 40, which it represents, and is given a reciprocating motion in the direction of its axis. Furthermore feeding motion is provided by slowly turning said hardened gear and a soft tool blank (41) on their respective axes 44 and 39, as if gears 40 and 41 would mesh with each other. In this process the tooth surfaces of gear 41 are generated to be fully conjugate to the teeth described by the cutting edges of the hardened gear. The desired cutting edges are then obtained as the intersection of a given cutting face with the generated tooth sides of tool blank 41. The tooth sides of a cutting tool of spur gear form are surfaces parallel to the tool axis and containing cutting edges as obtained through generation in the aforesaid manner.

Tools for cutting helicoidal shapes, such as helicoidal gears, may be determined in an analogous manner. The correct form of their cutting edges may be generated by cutting edges of a hardened gear representing the desired product, by imparting to this hardened gear a helicoidal reciprocation in the direction of its axis, so that its cutting edges describe the helical tooth surfaces of the desired product. Fully conjugate tooth surfaces are thereby formed on a soft tool blank (41, Fig. 11). The cutting edges may again be determined as the intersection lines of given cutting faces with the side surfaces formed on said soft tool blank.

On helical tools constructed in the aforesaid manner the cutting edges formed on the two sides of the teeth are found to differ from each other, as may be demonstrated experimentally or with the known methods of mathematics.

Accordingly also the two side surfaces of a cutting tooth differ from each other. A rear view of a helical cutting tool is indicated in Fig. 7, which clearly shows the different inclination of the two profiles 54, 55 in a plane perpendicular to the tool axis. The profile inclination may be characterized by the position of two tooth normals 56, 57, at profile points 58, 59 of equal distance from the cutter axis. It is seen that the tooth normals 56, 57 have a different distance from the axis of the cutter, inasmuch as they are tangent to concentric circles 60, 61 of different diameters. The inclination is larger on the profile (55) whose helical side surface (55′) is visible in the rear view of the tool (Fig. 7). The profile (54) whose side surface (54′) is hidden from view, in the rear view of the tool, has a smaller inclination than the opposite profile (55).

This holds true alike on tools for generating noninvolute gears and articles and on tools for generating involute gears. In the latter case, the two side surfaces 54′, 55′ may be made involute helicoidal surfaces of equal hand and equal lead and having different pressure angles.

Fig. 4 illustrates a cutting tooth of a tool similar to the one shown in Fig. 8, and Fig. 5 illustrates a cutting tooth of a tool similar to the one shown in Fig. 1, both figures being sections taken at right angles to the tool axis. Cutting tool 12 of Fig. 1 is suited to generate noninvolute spur gears, meshing along lines of action of S-form, as indicated at 62 in Fig. 1. With a suitable curvature and inclination of said S-form, tools may be constructed, whose profiles 64 and whose cutting edges have a minimum radius of curvature at a point 65 intermediate the outside end and the inside end of a profile or cutting edge, so that adjacent their inside ends they are less curved than adjacent their central portion, and are free from undercut.

In Fig. 4, the profile 66 of cutting tooth 67 is tangent to a radius 68 drawn through the cutter center. Profile 66 and the cutting edge corresponding to it extend further to the inside from the point of tangency 70, and unlike involute profiles have a finite radius of curvature at said point of tangency 70. One novel use of tools of this character will now be described with reference to Fig. 8.

The known gear shaping process is practically limited to the use of cutters having comparatively large tooth numbers, and therefore to the production of gears of fine or medium pitch only.

One reason for this limitation lies in the inability of cutters of small tooth number to generate the tooth profiles to a sufficient depth. In Fig. 8 the line of action 72 between gear 71 and its mating gear ends at a point 73, which is outside of the reach of a cutter (74) having a small number of cutting teeth. I have discovered that noninvolute gears having a curved line of action 72 may be generated to a sufficient profile depth even with a cutter (74) of small tooth number, as follows:

A cutter 74 is provided, which is suited to mesh with the finished tooth sides of a gear blank along a line of action corresponding to a pitch point 75 disposed nearer to the root of the gear teeth than pitch point 76 of line of action 72. In other words a cutter is provided which during generation rolls on a circle smaller than the pitch circle 77 of gear 71.

Gear 71 and its mating gear contact at point 73 when the tooth normal 78 at said point passes through pitch point 76, as well known. The said point of the gear tooth profile moves in a circle around the gear center, during the mesh, and at one time has a position 73′ inside of the reach of cutter 74. The tooth normal (78′) then passes through a point 75, which as explained may be made the point at which the cutter rolls on the blank during generation. With the information disclosed, the shape of the cutter 74 may be determined with the known methods of kinematics, or also by actual generation as has been described.

Cutter 74 is shown in a diagrammatic manner, only its cutting profiles being indicated and a few connecting lines. The axis of the cutter is disposed in plane 80, which also contains the gear axis, and is inclined to said axis. The cutting teeth contain profiles as described with reference to Fig. 4.

The profiles 81 of cutting tooth 82 are straight lines (Fig. 6), and the side surfaces of cutting tooth 82 may be made planes extending parallel to the tool axis. A very simple tool is thereby formed, for representing a gear or toothed article having straight tooth profiles, while nevertheless the tool is capable of cutting the same product throughout its life.

In Fig. 9 a gear cutter 84 is diagrammatically indicated through its cutting edges and a few connecting lines. Cutter 84 is shown in engagement with a gear blank 85 having an axis 86. The axis of cutter 84 is disposed in a plane 87, and is inclined to the gear axis 86, in the manner of axis 14 (Fig. 2) with respect to axis 13.

Fig. 9 specifically illustrates one way of rough cutting involute gears with a tool of comparatively few cutting teeth. In the rough cutting operation, prior to finish cutting, the bulk of the stock is removed, so that in the finish cutting operation the cutting effort is smaller to obtain accurate teeth with a good finish, as well known. With the specific conditions illustrated, the inclination of the cutter axis provides insufficient relief in the shaded area 88, included between tangent 89 to base circle 90 and the outside circle of gear blank 85, and disposed on one side of plane 87, namely on the entering side of the teeth. Area 88 is nonexistent on involute cutters of large tooth number, and on most other cutters, such as cutters of the character shown in Fig. 1. Even when existent, area 88 is entirely without consequence in the finishing operation, in which the contact between the gear blank and the tool extends substantially along the lines of action, and does not pass through area 88.

However when generating involute gears in one cut from the solid with a cutter 84, or when rough cutting in the conventional manner, the tool may be required to cut inside of said area 88 and cut there not as freely as desired with the profile flank of side 91.

This infrequent condition may be remedied in two ways, in accordance with the present invention. One way consists in providing more relief on the side 91 of the cutting teeth than on their opposite side 92. The teeth of even a spur gear cutter extend then along helices slightly inclined to the direction of the cutter axis.

Another remedy is the one illustrated in Fig. 9, which resides in a modified method of cutting. Cutter 84 and gear blank 85 are gradually approached to each other while reciprocatory cutting motion is provided, and are turned on their respective axes. The generating feed consisting of said turning motions is comparatively rapid or coarse, whereas the approaching motion is so slow that the gear blank (85) has made a complete revolution before the said approaching motion is completed. The tooth bottoms 93 formed in this roughing operation lie on a spiral having a radial pitch smaller than the depth of the gear teeth, as is understood.

For convenience it is assumed in Fig. 9 that the radial feeding motion is attributed to the cutter. The cutter may be fed from the position shown in dotted lines to the position shown in full lines, per revolution of the gear blank 85. In the cutter position shown in dotted lines, the cutter axis passes through a point 94', which is at point 94 when the cutter is in the position shown in full lines.

The cutter and the blank are not only turned on their axes at the inverse ratio of their numbers of teeth, but additional turning motion is imparted either to the gear blank or to the cutter, so that the cutting action follows side 95 of the gear teeth more than the other side. The profiles of a finished gear blank are indicated in dotted lines. The feeding motion is seen to be effected in a manner that the cutting edges envelop a line closely adjacent to the final tooth profile of side 95. This can be effected for instance with known cam means, which change the angular position of the tool or the gear blank in accordance with the radial feed. Broadly the relation of the turning angles of the gear blank and of the tool is changed in a manner depending on the said radial feed or approaching movement. In the same angular position of the gear blank, the tooth center line 96 is disposed at an angle to plane 87 in one illustrated position of feed, and it coincides with plane 87 in the other illustrated position of feed.

It can be readily perceived, that with the aforesaid arrangement no stock is left at the place where side 91 of the cutting tooth intersects area 88.

Outside of providing a remedy for the condition explained, the method described is useful in many other respects, and broadly is not limited to rough cutting, but may also be used for finish cutting.

Fig. 14 diagrammatically illustrates a tool 100, constructed in accordance with the present invention and having an axis disposed in plane 101, which also contains the axis 102 of blank 103, such as a gear blank provided with a hub. Tool 100 contains a conventional centering surface for mounting said tool concentric with its axis, and is provided with a round cutting edge 104 for finishing the inside of hole 105, and with cutting teeth 106 for finishing the key ways or spline ways 107 provided in hole 105. The provision of a round cutting edge 104 is helpful in obtaining a product, whose hole and whose keyways are concentric with each other. To render the product also practically independent of slight eccentricities in the tool mounting, I preferably provide a number of cutting teeth 106 so related to the number of spline ways 107, that the last said number is an even multiple of the number of cutting teeth. So I may provide a number of cutting teeth 106 which is one half of the number of spline ways 107. With this arrangement slight eccentricities in the tool mounting have no ill effect on the product, inasmuch as the hole produced will be symmetrical and concentric with its axis, even when not truly circular.

Fig. 20 illustrates the use of a cutting tool 100, of the character referred to in Fig. 14, and of a gear cutting tool 110 on a gear blank 111. Both tools may be simultaneously used for cutting splined hole 112 and gear teeth 113 respectively. The advantage obtained is not only a high rate of production, but also an improved product, inasmuch as the teeth cut in the same setup of the gear blank as the hole will be surely concentric with the latter.

Gear blank 111 is disposed on a rotatably mounted support, and the tools are secured to rotatably mounted tool holders, whose axes 114, 115 are angularly disposed to each other, and which are reciprocated in the direction of axis 116 of gear blank 111.

Structure supporting this description will be further described with reference to Fig. 15 and Fig. 16, which illustrate a simple cutting device, the use of one cutting tool being illustrated. The one tool device shown may be transformed readily into a two tool device of the character referred to in Fig. 20, by simply adding another tool unit 120.

In Fig. 15 and Fig. 16, numeral 121 denotes a gear blank secured to a rotatably mounted support of known structure, having an axis 122. A tool 123 is secured to a rotatably mounted tool holder, whose axis 124 is angularly disposed to axis 122 and intersects said axis. The tool holder is mounted on a slide 125 which may be reciprocated in the direction of guides 126 provided on another slide 127. Guides 126 are inclined to axis 124 of the tool holder and parallel to axis 122 of the work support. Slide 127 and the mechanism carried by it constitute a tool unit 120. Slide 127 may be moved in the direction of guides 128 provided on the machine frame 129 and extending parallel to a plane containing the axes 122 and 124. Adjustment of slide 127 moves tool 123 radially towards or away from the gear blank 121.

In the simplified Figures 15 and 16 I have omitted to show known means for withdrawing the tool from the blank during the return stroke of the tool. I have also omitted to indicate the entire known train of gears and shafts for timing up tool 123 and gear blank 121. I have further omitted to show a complete driving arrangement, and indicated only diagrammatic means for effecting reciprocation, namely a lever 130 slidably keyed to its shaft and mounted on slide 127, and a rod 131 attached to lever 130 and on its other end to slide 125. Briefly I have tried to confine the showing as much as possible to the novel features.

A gear 132 is rigidly secured to shaft 124 of the tool holder, and meshes with another gear 133 having a smaller number of teeth than gear 132 and mounted on reciprocating slide 125. Gear 133 is slidably keyed to a shaft 134, which extends in the direction of reciprocation and which carries on its upper end a gear 135 mounted on slide 127. Shaft 134 is rigidly secured to said gear, which receives motion from a feed shaft in any suitable known manner, such as for instance by means of a worm 136 indicated in dotted lines.

To finish cut the teeth of a gear blank 121, slide 125 is reciprocated and slide 127 is fed towards the gear blank until the final cutting depth is reached. In the finishing operation this feed is through a small distance only and could be conveniently performed by hand. The work support and the tool holder are turned on their axes in timed relation to produce the generating feed. The turning motion lasts until the gear blank has performed a complete revolution after having reached full cutting depth, with reciprocation of slide 125 going on continuously.

The device shown in Fig. 15 and Fig. 16 may be changed over quickly from the production of straight teeth to the production of helical teeth or helical surfaces, by simply replacing shaft 134. Shaft 134 is separately shown in Fig. 17, and contains straight splines 140 extending parallel to its axis. It may also contain a threaded portion 141 for rigidly securing said shaft to gear 135. The straight splines 140 fit spline ways provided in the hole of gear 133, so that the latter is slidably keyed to shaft 134 in a manner that reciprocation of slide 125 does not change the angular position of gear 133.

The hole of gear 133 contains also helical spline ways of opposite hands, which cross the straight spline ways already referred to. The inside surface of said hole is shown in development in Fig. 19, where the straight spline ways are denoted with numeral 140'. The helical spline ways 142 and 143 of opposite hand appear as straight grooves in development. Gear 133 is therefore capable of receiving selectively a splined shaft 134, and shafts containing helical splines. Shaft 145, Fig. 18, is provided with helical splines 146, which also fit the hole of gear 133.

When shaft 145 is put in the place of shaft 134, by rigidly securing it to gear 135, reciprocation of slide 125 will turn gear 133, so that it moves in a helical path lengthwise of the helical splines 146. Rotation of gear 133 also turns gear 132 during the cutting stroke. A cutter of the character described with reference to Fig. 3 may then cut correct helical teeth on a gear blank.

Various changes and modifications may be made in my invention without departing from its spirit, by simply applying established practice to the disclosure here given.

For definition of the scope of my invention I rely on the appended claims.

What I claim is:

1. A cutting tool for feeding about an axis and reciprocating relatively to a blank in a direction inclined to said axis, comprising a body portion provided with a centering surface for mounting said tool concentric with said axis, a cutting tooth formed on said tool and having a constant thickness along lines of constant distance from said axis, a side cutting edge of said cutting tooth being tangent to a radial plane containing said axis, said cutting edge having a finite radius of curvature at its point of tangency with said plane and extending on both sides of said point of tangency.

2. A cutting tool for feeding about an axis and reciprocating relatively to a blank in a direction inclined to said axis, comprising a plurality of equal cutting teeth arranged in a circle about said axis, cutting faces inclined to said axis forming cutting edges on said cutting teeth, a cutting edge having a minimum radius of curvature at a point intermediate the ends of its finishing portion, the outside surfaces of said cutting teeth extending along lines of constant distance from said axis.

3. A cutting tool for forming holes containing spline ways and key ways, comprising a body portion having a centering surface for mounting said tool concentric with said axis, a round cutting edge for finishing the inside of said hole, at least one cutting tooth for finishing said ways, the number of cutting teeth being one half of the number of said ways in the piece to be cut, the outside surface of a cutting tooth extending along a line of constant distance from said axis.

4. A reciprocatory gear cutting tool, comprising a body portion, a plurality of equal cutting teeth arranged in a circle and projecting outwardly from an axis of said body portion, said cutting teeth numbering less than twelve, cutting faces and side surfaces of said cutting teeth forming convex cutting edges, said side surfaces and cutting faces being so shaped and positioned that the initial cutting edges of said tool and cutting edges formed through resharpening may contact with the tooth sides of a gear finished with said tool in a manner corresponding to a pitch point disposed inside of the pitch circle with which said gear rolls on the pitch circle of its mating gear.

5. A reciprocatory gear cutting tool, comprising a body portion, a plurality of equal cutting teeth arranged in a circle and projecting outwardly from an axis of said body portion, said cutting teeth numbering less than twelve, cutting faces and side surfaces of said cutting teeth forming convex cutting edges, said side surfaces extending substantially parallel to said axis and being so shaped and positioned that the initial cutting edges of said tool and cutting edges formed through resharpening may contact with the tooth sides of a gear finished with said tool in a manner corresponding to a pitch point disposed inside of the pitch circle with which said gear rolls on the pitch circle of its mating gear.

6. A reciprocatory tool for cutting non-involute gears, comprising a body portion, a plurality of equal cutting teeth arranged in a circle and projecting outwardly from an axis of said body portion, said cutting teeth numbering less than twelve, cutting faces and side surfaces of said cutting teeth forming curved cutting edges, a cutting edge being tangent to a radial plane containing said axis and extending as a continuous unbroken line past the point of tangency with said plane.

7. A cutting tool for feeding about an axis and reciprocating relatively to a blank in a direction inclined to said axis, containing a plurality of helical cutting teeth arranged in a circle about said axis, said cutting teeth containing cutting edges conjugate to helical gears of symmetrical tooth profiles in a position where the axis of said tool intersects the axes of said gears, the two side surfaces of said cutting teeth having equal lead, and the profiles of said side surfaces in a plane perpendicular to the tool axis having different inclinations.

8. A cutting tool for feeding about an axis and reciprocating relatively to a blank in a direction inclined to said axis, containing a plurality of helical cutting teeth arranged in a circle about said axis, said cutting teeth containing cutting edges conjugate to helical gears of symmetrical tooth profiles in a position where the axis of said tool intersects the axes of said gears, the two side surfaces of said cutting teeth having equal lead, and the profiles of said side surfaces in a plane perpendicular to the tool axis having different inclinations, the inclination being larger on the side surface which is visible in the rear view of the tool.

9. A cutting tool for feeding about an axis and reciprocating relatively to a blank in a direction inclined to said axis, containing a plurality of helical cutting teeth arranged in a circle about said axis, said cutting teeth containing cutting edges conjugate to helical gears of symmetrical tooth profiles in a position where the axis of said tool intersects the axes of said gears, the two side surfaces of said cutting teeth being involute helicoidal surfaces of equal lead and of different pressure angle.

ERNEST WILDHABER.